United States Patent [19]
Matusek

[11] 3,975,048
[45] Aug. 17, 1976

[54] ROTARY SUNROOF FOR AN AUTOMOTIVE VEHICLE

[76] Inventor: Edward J. Matusek, 4128 N. Main St., Royal Oak, Mich. 48073

[22] Filed: Apr. 15, 1974

[21] Appl. No.: 460,814

[52] U.S. Cl. .............................. 296/137 B; 49/41; 52/65
[51] Int. Cl.² ........................................ B60J 7/08
[58] Field of Search ..................... 296/137 B, 137 E; 98/2.14; 49/39, 41, 171; 52/65, 64

[56] References Cited
UNITED STATES PATENTS

| | | | |
|---|---|---|---|
| 1,039,255 | 9/1912 | Clarke | 52/65 X |
| 1,428,139 | 9/1922 | Brown | 52/65 X |
| 2,020,346 | 11/1935 | Ackermans | 296/137 R |
| 2,197,074 | 4/1940 | Edwards | 49/41 X |
| 2,237,696 | 4/1941 | Biederman | 49/41 |
| 2,433,456 | 12/1947 | Jansen | 49/41 X |
| 2,704,207 | 3/1955 | Howard | 49/39 X |
| 3,174,794 | 3/1965 | Moynihan, Jr. | 296/137 R |

FOREIGN PATENTS OR APPLICATIONS 568,755   4/1945   United Kingdom ............. 296/137 R

*Primary Examiner*—Albert J. Makay
*Assistant Examiner*—Donald W. Underwood
*Attorney, Agent, or Firm*—Gifford, Chandler & Sheridan

[57] ABSTRACT

A sunroof for vehicles which has a panel rotatable about a vertical axis and capable of selectively obstructing and uncovering an opening in the roof of the vehicle, admitting or restricting the passage of light and air from the outside to the passenger compartment of the vehicle.

7 Claims, 7 Drawing Figures

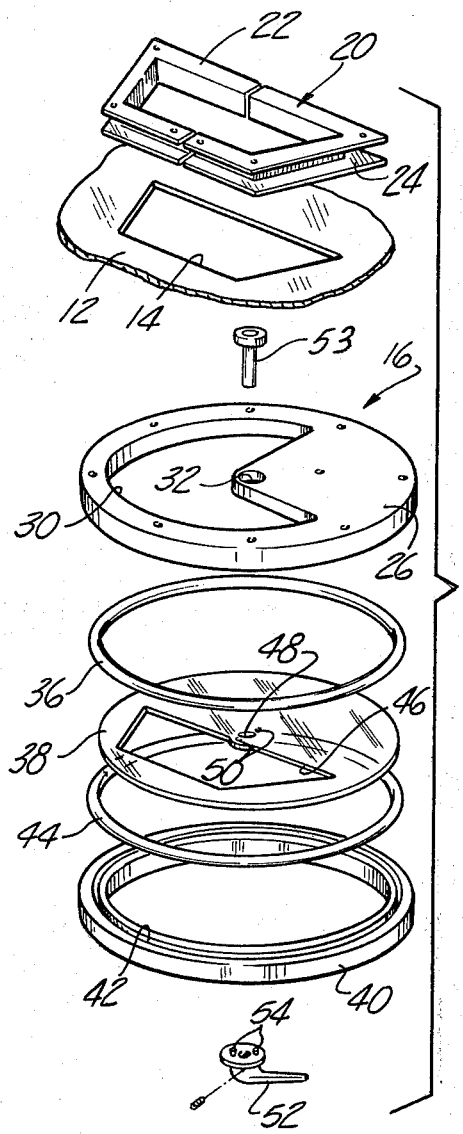
Fig-5
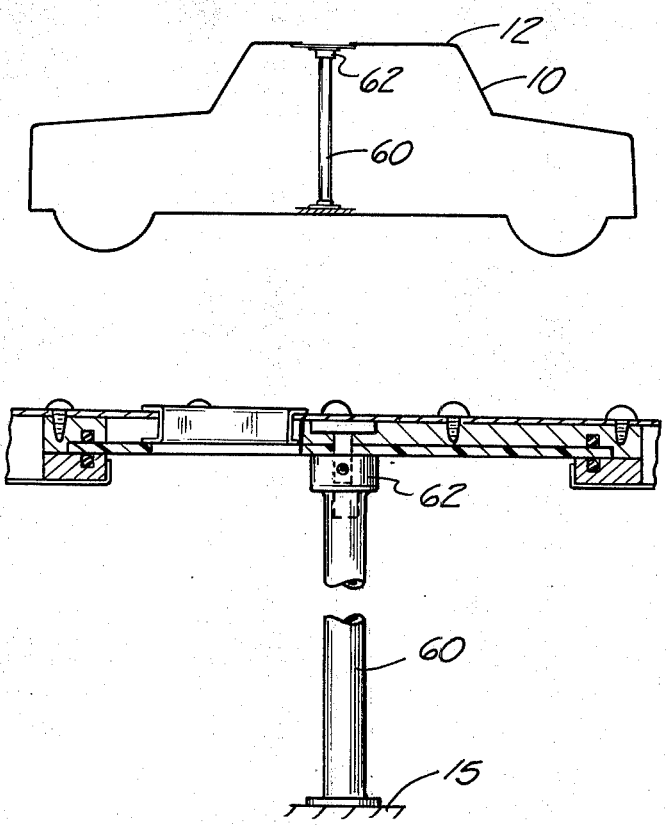
Fig-6
Fig-7

ROTARY SUNROOF FOR AN AUTOMOTIVE VEHICLE

BACKGROUND OF THE INVENTION

I. Field of the Invention

The present invention relates to roofs used on vehicles and more particularly to roofs that may be opened to admit light and fresh air to the passenger compartment of automotive vehicles.

II. Description of the Prior Art

Designers and engineers have been highly successful in protecting the passenger compartment of automotive vehicles from inclement weather. Moreover, many vehicles are produced today with sophisticated air handling and temperature control systems to maintain a comfortable pre-selected environment within the passenger compartment, irrespective of conditions existing outside of the vehicle. Nonetheless, there remains the desire on behalf of some people to occasionally experience their environment directly. These people wish to enjoy an uncovered passenger compartment.

The prior art discloses many ways to provide a roof for the passenger compartment of an automotive vehicle which is both sealed against inclement weather and which can be opened for the added enjoyment of the vehicle's occupants. These methods include rigid completely removable roofs and roof panels, rigid sliding roof panels, flexible folding convertible roofs, and flexible folding roof panels. There are many problems associated with the prior art.

Completely removable rigid and flexible roofs provide the occupants of the vehicle no protection against serious injury in the event the vehicle becomes involved in an accident and rolls over.

Rigid removable roof panels are difficult to remove and install, cumbersome to handle, and require valuable luggage space to store. In addition to the fact that all materials used for flexible roof and roof panels are subject to damage by vandalism, these materials also deteriorate with time and must be periodically replaced.

Sliding rigid sunroof panels provide one of the most attractive solutions to the problem of opening the roof of an automotive vehicle to admit light and fresh air while at the same time permitting the roof to be closed in the event of inclement weather. However, the prior art devices of this type all suffer from complexity of design, high cost of manufacture and an inability to open only the left or the right side of the aperture in the roof, in addition to opening the entire aperture, as the prior art devices all slide forward and backward along the main longitudinal axis of the vehicle.

SUMMARY OF THE PRESENT INVENTION

The present invention provides an improved rigid sunroof panel designed to rotate about an axis which is substantially perpendicular to both the roof of the vehicle and the panel itself. This configuration allows a substantial portion of the roof to be opened while not interfering with the basic integrity of the roof structure, thus affording the occupants of the vehicle some measure of protection against serious injury in the event the vehicle rolls over. Owing to the novel nature of this invention, it is not only simple and trouble-free in operation but also of low cost when mass produced.

Means are provided for effectively sealing the rotary panel to the roof itself, thereby protecting the passenger compartment against inclement weather. In addition to providing a sunroof which covers or uncovers the entire aperture in an automotive roof, it is the further object of this invention to provide a sunroof which may be positioned to uncover only the left hand or the right hand side of the aperture in the roof, leaving the other side covered.

BRIEF DESCRIPTION OF THE DRAWINGS

A better understanding of the present invention will be achieved upon reference to the following drawings in which like reference characters refer to like parts throughout the several views, and in which:

FIG. 5 is an exploded perspective view of the assembly of the present invention;

FIG. 6 is a diagrammatic view of another preferred embodiment of the present invention; and FIG. 7 is an enlarged fragmentary cross-sectional view of the structure shown in FIG. 6.

DESCRIPTION OF THE PREFERRED EMBODIMENT

Figure 1:
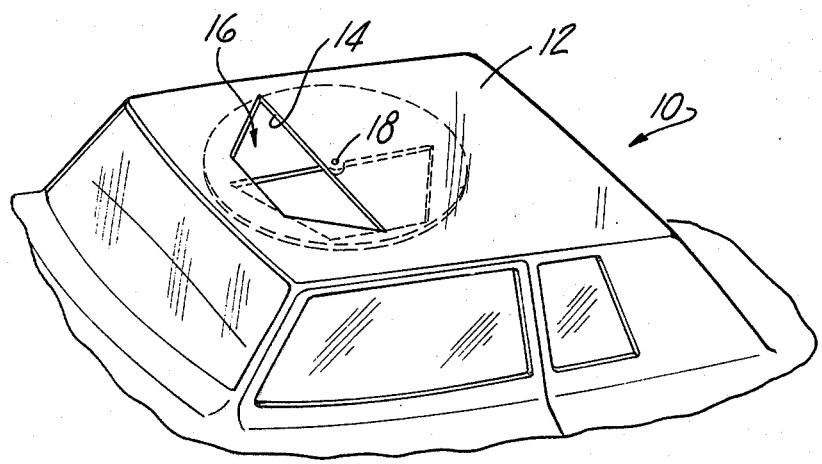
FIG. 1 is a perspective view of the roof and upper portion of an automotive vehicle showing the rotary panel of the sunroof positioned to uncover the right side of the aperture in the roof.

FIG. 1 illustrates the present invention installed in an automobile 10. The automobile 10 is provided with an outer roof panel 12 having an aperture 14 and a rotatable sunroof assembly 16 is mounted below the roof panel 12 to open and close the aperture 14.

Figure 2:
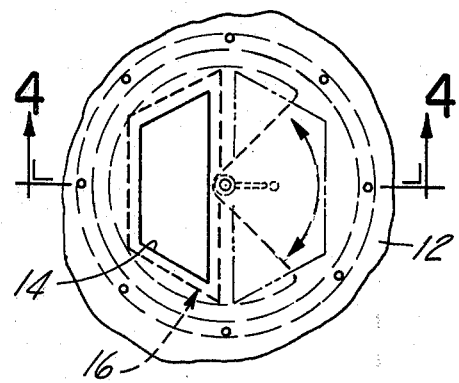
FIG. 2 is a top view of the roof shown in FIG. 1 with the rotary panel positioned to uncover the left hand side of the aperture in the roof.
Figure 3:
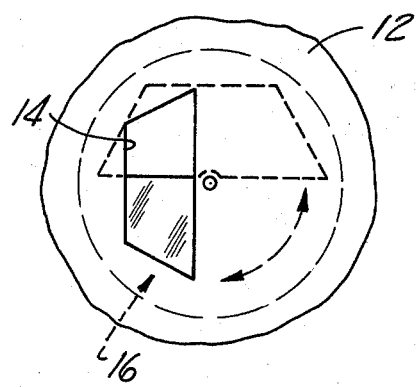
FIG. 3 is a view similar to FIG. 2 but illustrating the rotary panel in a position completely opening the aperture in the roof.
Figure 4:
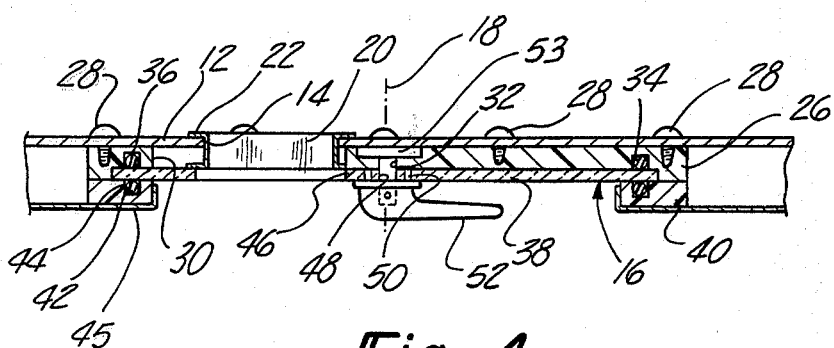
FIG. 4 is a cross-sectional view of the rotary sunroof as viewed along line 4—4 of FIG. 3, enlarged somewhat for purposes of clarity.

As will be more apparent as the description proceeds, the sunroof assembly 16 is rotatable about a vertical axis 18 to open and close the aperture 14. The assembly 16 is illustrated in FIG. 1 in a position opening the driver's side of the aperture 14 while closing the passenger's side. It is shown in FIG. 2 in a position opening the passenger's side and closing the driver's side. It is shown in FIGS. 3 and 4 in a fully opened position. It will be clear that the assembly 16 can be rotated about the axis 18 to a position completely closing the aperture 14.

The assembly 16 is best illustrated in FIG. 5 and comprises a two-piece support member 20 which frames the aperture 14 and which as best seen in FIG. 4 comprises an upper vertical flange portion 22 adapted to seat on the upper surface of the outer roof panel 12 and a lower vertical flange portion 24 spaced downwardly from the lower surface of the roof panel 12. The support member 20 is preferably mounted in place by screws (not shown) extending into the roof panel 12 although other fastening means can of course be used.

A circular support plate 26 is mounted to the lower surface of the roof panel 12 preferably by screws 28 (FIG. 3) although again other fastening means could be employed. The support plate 26 is provided with an arcuate opening 30 which is aligned with the aperture 14. A central opening 32 extends through the axis of the support plate 26 at the apex of a U-shaped portion formed by the opening 30. As can best be seen in FIG. 4, an annular groove 34 is formed on the lower surface of the support plate 26 to carry an O-ring seal 36.

The seal 36 bears against the upper surface of a circular panel 38 mounted in position by a lower support ring 40. The support ring 40 is provided with an upper annular groove 42 which carries an O-ring 44 which bears against the lower surface of the circular panel 38.

While O-ring seals 36 and 44 have been described it is apparent that other sealing means could be used in their place.

As can best be seen in FIG. 4, the support ring 40 is mounted in place by a flanged inner roof structure 45 of the automobile 10.

While the panel 38 has been shown as circular and the other parts are annular or circular, it should be apparent that other configurations of these parts could be used as well.

The circular panel 38 can be either opaque, translucent or transparent and is provided with a trapezoidal cut-out portion 46 which coincides with the aperture 14 in the roof 12 of the automobile 10. A central opening 48 is aligned with the opening 32 provided in the support member 26. Apertures 50 are provided on opposite sides of the opening 48. The openings 48 and 32 receive a flanged shaft 53 which has its lower end fastened to a handle member 52 located in the interior of the automobile 10. The handle 52 is provided with upstanding pegs 54 (FIG. 5) received in the apertures 50 of the circular panel 48 so that the panel 48 is rotatable by the handle 52 with respect to the remaining members of the assembly 16.

It is apparent that as the invention has thus far been described the circular panel member 38 can be rotated from a closed position in which the opening 46 is located on the right hand side of FIG. 4 and the roof is thus closed to either of the positions shown in FIGS. 1, 2 or 3.

With the panel member 38 in the position shown in FIG. 1 the driver's compartment would be open to the exterior through the aperture 14 while the driver's side would be closed.

With the panel member rotated to the position shown in FIG. 2 the driver's side of the automobile would be closed while the passenger's compartment would be open.

With the panel member rotated to the position shown in FIGS. 3 and 4 both sides would be open.

This variety and adjustment is not possible with sunroofs of known construction.

FIGS. 6 and 7 disclose another embodiment similar to the embodiment shown in FIGS. 1–5 except that a post 60 is provided extending from the floor 15 to the roof 12 of the vehicle. The upper end of the post 60 rotatably supports a sunroof assembly 16 identical to the assembly shown in FIGS. 1–5. A handle portion 62 permits the circular panel 38 to be rotated in the manner described above. The post 60 provides additional support for the vehicle in the event of an accident while at the same time providing means for rotating and supporting the sunroof assembly 16.

While the present invention has been described with reference to automotive vehicles it is to be understood that it could be used with other vehicles such as boats or the like as well as with mobile homes and the like.

It is also apparent that with slight modification means such as an electric motor or the like, can be provided for producing rotation of the panel 38.

Although I have described but one embodiment of my invention many changes and modifications can be made therein without departing from the spirit of the invention expressed by the appended claims.

I claim:

1. A vehicle having a driver's compartment and a passenger's compartment adjacent said driver's compartment, said vehicle also having a roof and floor, an aperture disposed in said roof above both said compartments for admitting light and fresh air into said compartments, a panel rotatably attached to said roof about an axis substantially perpendicular to both said roof and said panel, said panel being rotatable between a first position totally obstructing said aperture, a second position obstructing only the portion of said aperture above said passenger's compartment, a third position obstructing only the portion of said aperture above said driver's compartment and a fourth position opening the aperture above both said compartments, control means connected to said panel for selectively, rotatably moving said panel to thereby control the amount of obstruction of said aperture, and an elongated downwardly extending panel support member disposed along the axis of rotation of said panel, the lower end of said support member being engageable with the floor of said automotive vehicle and the upper end being engageable with said panel.

2. The invention as set forth in claim 1 wherein said panel is transparent.

3. The invention as set forth in claim 1 wherein said panel is transparent and tinted.

4. The invention as set forth in claim 1 wherein said panel is opaque.

5. The invention as set forth in claim 1 wherein said panel is translucent.

6. The invention as set forth in claim 1 wherein said control means comprises a handle disposed on said axis of rotation of said panel.

7. The invention as set forth in claim 1 and including sealing means mounted in said roof and engaging said panel to restrict the passage of air and water through said aperture in said roof when said panel has been rotated to totally obstruct said aperture in said roof.

* * * * *